UNITED STATES PATENT OFFICE 2,024,658

PREPARATION OF MIXED ESTERS OF CELLULOSE

Thomas F. Murray, Jr., and Cyril J. Staud, Rochester, N. Y., assignors to Eastman Kodak Company, Rochester, N. Y., a corporation of New York No Drawing. Application July 16, 1932, Serial No. 623,020

5 Claims. (Cl. 260—101)

The present invention relates to the preparation of cellulose acetate-higher acylates in which the higher acyl group contains more than 2 carbon atoms, characterized by the addition of acetic anhydride at the end of the esterification to eliminate graininess.

The preparation of mixed esters of cellulose in which an unsubstituted acid anhydride having a greater number of carbon atoms than acetic anhydride has been employed in the usual proportions, has sometimes been characterized by graininess of the resultant esterification mixture or dope. Increasing of either the time or the temperature of esterification not only will not always appreciably reduce the amount of grain present in the resulting dope but sometimes decreases the viscosity of the dope which apparently indicates some degradation of the cellulose has occurred.

We have found that if acetic anhydrid is added to the dope which contains grain but has a good viscosity, the grain and any fiber that may be present is removed and a clear smooth dope of high viscosity is obtained. It has previously been known that all of the available hydroxyl groups of cellulose do not esterify with the same ease or rapidity. It is our theory that the cause of the graininess or cloudiness in esterification dopes is due to the presence of incompletely esterified cellulose which is highly swollen in the mixture or which is in a state of aggregation which prevents its homogeneous dispersion therein. Some of the incompletely esterified cellulose may exhibit little or no dispersion in the esterification mixture and is found in the form of fibers in the esterification mixture or dope. We have found that when a relatively small amount of acetic anhydrid is added to the reaction mixture or dope which contains graininess and fiber and the reaction conditions are maintained for a short time longer the grain and fiber present completely disappears giving a dope having an appearance comparable to that of the dopes formed when acetic anhydrid is the sole anhydrid employed in the esterification of cellulose.

Obviously this procedure which we have discovered is applicable to cellulose esterification processes in which an anhydrid weaker than acetic anhydrid is employed such as the anhydrid of an aliphatic acid containing more than 2 carbon atoms such as crotonic, propionic, butyric, lauric, etc. We have found our process especially valuable in the preparation of cellulose acetate-higher acylates, in which the higher acyl group contains 3–4 carbon atoms and in which the esterification bath comprises acetic acid and the higher anhydrid.

Obviously, if an excess of the higher organic acid anhydride is employed in the original acylation bath the esterification will be complete and grain and fiber will not be present in the dope, but the present process assures the absence of grain or fiber when only the normal amount of the higher anhydride is employed and yet the proportion of acetyl groups to higher acyl groups in the resulting ester is substantially the same as where an excess of the higher anhydride is employed. We have found that the use of acetic anhydride at the end of the esterification eliminates the necessity of employing an excess of the higher anhydride. The following example illustrates an esterification process in which an excess of higher anhydride is employed:

10 lbs. of cotton linters were pretreated with a mixture of 70 lbs. of glacial acetic acid containing about 1 lb. of mixed catalyst (1 part sulfuric acid to 3 parts phosphoric acid). This mixture was maintained at room temperature for 22 hours. At the end of this time 38 lbs. of crotonic anhydride was added and the temperature was raised from 20° to 32° C. over a period of 3 hours. Esterification was allowed to proceed for 25 hours after which time a clear viscous dope containing no grain or fiber was formed. 20 lbs. of acetone was then added, the mixture was stirred until homogeneous and was then precipitated in water. The cellulose acetate-crotonate formed exhibited an apparent acetyl content of 44.9%, 93% of the acyl content being acetyl groups and the remaining 7% being crotonyl groups.

However, the use of an excess of high anhydride may be avoided, with resulting economy of reagents by our invention and yet the percentage of higher acyl groups in the total acyl content is substantially the same. The following examples illustrate the carrying out of our invention.

Example I 50 lbs. of cotton linters were pretreated with 368 lbs. of glacial acetic acid containing 2 lbs. of the sulfuric-phosphoric mixed cataylst for 18 hours at room temperature (20–25° C.). 116 lbs. of crotonic anhydride was added and the whole was maintained at approximately 30° C. for 28 hours. A dope was formed but it exhibited considerable graininess. 48 lbs. of 85% acetic anhydride was added and the mass was maintained at 30° C. for 2½ hours forming a smooth dope free from grain. The cellulose acetate-crotonate formed was precipitated out and upon analysis showed an apparent acetyl content of 43.5%. Acetyl groups constituted 93.1% of the total acyl content and the crotonyl content was 6.9%. This value corresponds closely with that obtained in the esterification process given above in which an excess of higher organic anhydride was employed. The crotonyl content of the cellulose acetate-crotonate prepared in Example I was 3.0% while that of the cellulose acetate-crotonate prepared using an excess of higher anhydride as illustrated above was 3.14%.

The procedure of Example I was carried out again except that no acetic anhydride was added as specified by our invention. The cellulose acetate-crotonate formed gave an analysis of 36.8% apparent acetyl content, 8% of the total acyl groups being crotonyl. The content of crotonyl groups of that cellulose acetate-crotonate was 2.94%.

*Example II*

About 50 lbs. of cotton linters is pretreated with approximately 350 lbs. of glacial acetic containing a small amount of a catalyst, such as sulfuric acid. This mixture may be allowed to stand for 1-2 days at room temperature. About 156 lbs. of butyric anhydrid is then added and the mass is agitated at a temperature of 30-35° C. until a viscous dope containing a small amount of grain is obtained (usually about 20 hours). About 50 lbs. of acetic anhydrid is then added and the agitation and maintenance of temperature is continued until any grain or fiber which may be present disappears.

The ester formed may be separated from the reaction mixture in any known manner such as by precipitating it in isopropyl ether as disclosed in Malm and Fordyce application, Serial No. 553,646, filed July 28, 1931. The ester is then washed with iso-propyl ether and dried. It exhibits solubility in acetone, ethylene chloride, BB' dichlorethyl ether, ethyl acetate, ethylene chloride-alcohol, etc.

*Example III*

100 lbs. of cotton linters is pretreated with 800 lbs. of glacial acetic acid containing a small amount of any well known acylation catalyst. After allowing this mixture to stand about a day at or near 25° C., 170 lbs. of propionic anhydrid is added and the esterification is carried out according to the method given in the preceding examples, namely at a temperature of about 35° C. with accompanying agitation of the mixture. After the dope is formed about 30 lbs. of acetic anhydride is added, and the temperature and stirring is continued for a short time or until all the grain present in the dope disappears. The cellulose acetate-propionate formed may be precipitated out from the reaction mixture in any known manner. The product so obtained is soluble in acetone, ethyl (or methyl) acetate, ethylene chloride, ethylene chloride-alcohol (4:1), propylene chloride-alcohol (4:1), BB' dichlorethyl ether, etc.

As pointed out above various conditions such as proportions, temperatures, catalysts, etc., may be varied as a matter of technique and individual judgment by the operator, and such modified processes are within the scope of our invention. Obviously the amount of acetic anhydrid which is added toward the end of the esterification process depends on the amount of grain which it is necessary to eliminate from the dope.

The esters formed by esterification processes according to our invention, as would be expected, give when coated out from their solutions in volatile solvents such as acetone or ethylene chloride, skins, sheets or tissues of clarity and brilliance which are eminently suitable for photographic film, wrapping purposes, laminating glass or any other use for which cellulose derivative sheets are employed at present. These esters are also compatible with various plasticizers such as triphenyl phosphate and the like to increase the flexibility of the skins formed from these esters.

The esters produced according to our process are also eminently suited for the production of artificial silk either by evaporative processes or by coagulation methods.

We claim as our invention:

1. In a process of making a mixed ester of cellulose containing acetyl and aliphatic acid radicals of more than two carbon atoms in which the cellulose mixed ester dope formed by the initial esterification bath contains grain or haze, the step which comprises adding a small proportion of acetic anhydride to that dope to eliminate the haze or grain therefrom.

2. In a process of making a mixed ester of cellulose containing acetyl and aliphatic acid radicals of 3-4 carbon atoms in which the completed initial esterification bath of the cellulose mixed ester contains grain or haze, the step which comprises adding a small proportion of acetic anhydride to that bath to eliminate the haze or grain therefrom.

3. In a process of making a mixed ester of cellulose containing acetyl and crotonyl radicals in which the completed initial esterification bath of the cellulose mixed ester contains grain or haze, the step which comprises adding a small proportion of acetic anhydride to that bath to eliminate the haze or grain therefrom.

4. In a process of making a mixed ester of cellulose containing acetyl and butyryl radicals in which the completed initial esterification bath of the cellulose mixed ester contains grain or haze, the step which comprises adding a small proportion of acetic anhydride to that bath to eliminate the haze or grain therefrom.

5. In a process of making a mixed ester of cellulose containing acetyl and propionyl radicals in which the completed initial esterification bath of the cellulose mixed ester contains grain or haze, the step which comprises adding a small proportion of acetic anhydride to that bath to eliminate the haze or grain therefrom.

THOMAS F. MURRAY, JR.
CYRIL J. STAUD.